United States Patent [19]
McRae et al.

[11] Patent Number: 5,944,034
[45] Date of Patent: Aug. 31, 1999

[54] APPARATUS AND METHOD FOR RECYCLING OIL LADEN WASTE MATERIALS

[75] Inventors: Harrell J. McRae, Huffman; James R. Nickerson, Pittsburg, both of Tex.

[73] Assignee: McNick Recycling, Inc., New Caney, Tex.

[21] Appl. No.: 08/816,618

[22] Filed: Mar. 13, 1997

[51] Int. Cl.$^6$ ..................................... B08B 9/20
[52] U.S. Cl. .................... 134/25.4; 198/409; 110/236
[58] Field of Search .................... 198/409, 773; 110/236; 210/774, 806, 248; 134/25.1, 25.4

[56] References Cited

U.S. PATENT DOCUMENTS

| | | | |
|---|---|---|---|
| 4,441,922 | 4/1984 | Most et al. | |
| 4,476,791 | 10/1984 | Cegielski, Jr. | 110/346 |
| 4,534,300 | 8/1985 | Reed et al. | 110/171 |
| 4,544,491 | 10/1985 | Tyson et al. | 210/772 |
| 4,629,056 | 12/1986 | Simelunas | 198/409 |
| 4,922,838 | 5/1990 | Keller et al. | 110/234 |
| 5,135,176 | 8/1992 | Barber | 241/23 |
| 5,188,300 | 2/1993 | Wolf | 241/23 |
| 5,214,830 | 6/1993 | Rozychi | 29/240 |
| 5,228,626 | 7/1993 | Mayolo | 241/65 |
| 5,236,136 | 8/1993 | McCarty et al. | 241/24 |
| 5,298,079 | 3/1994 | Guymon | 134/16 |
| 5,349,901 | 9/1994 | Brittain et al. | 100/37 |
| 5,360,553 | 11/1994 | Baskis | 210/774 |
| 5,366,165 | 11/1994 | Jackman | 241/24 |
| 5,401,293 | 3/1995 | Gardner | 75/403 |
| 5,524,356 | 6/1996 | Lutz | 34/164 |
| 5,735,197 | 4/1998 | Kleine | 100/127 |

*Primary Examiner*—Robert J. Popovics
*Attorney, Agent, or Firm*—Head, Johnson & Kachigian

[57] ABSTRACT

A system for treating oil laden used products, e.g., oil filters to achieve complete recycle of the products. The used products are heated in a primary combustion zone under reducing conditions to lower the viscosity of the oil for removal and to create oil in vapor form. The oil vapor is passed to a reclamation chamber where oil is condensed and removed. The remaining vapors are led to a secondary combustion chamber under greater than stoichiometric conditions to produce clean exhaust.

7 Claims, 5 Drawing Sheets

APPARATUS AND METHOD FOR RECYCLING OIL LADEN WASTE MATERIALS

BACKGROUND OF THE INVENTION

1. Field of the Invention

The present invention relates to apparatus and method for recycling oil laden waste or used materials, and in particular to the reclamation of used or spent oil filters.

2. Prior Art

Oil filters as used in most internal combustion engines are used to clean the oil as it circulates therethrough. A typical oil filter is made up of a metal canister within which some form a porous media or paper like materials are therein contained. In addition to the metal and porous media a typical oil filter also contains an elastomeric seal and, in some cases, plastics that are used within the filter. Because oil filters need to be changed often the disposal of the filters has become a major environmental problem. Recycling the filter is not an easy task, and thus, most of such waste has been heretofore disposed in landfills. Since the oil filter is not biodegradable this presents additional environmental problems. As a result, government regulations now require some form of environmental disposal. The lubrication service businesses and others are therefore faced with no easy method of recycling or disposing of the oil filters.

Many of the prior art oil filter recycling operations do not consider the total recycling possibilities of the products that go to make up the filter. Many systems have as their prime objective simply to remove or clean the oil from the steel filter container and then dispose in some manner the paper filter medium. In many instances this wastes a large percentage of the oil simply burned in after burners.

U.S. Pat. No. 5,298,079 of E. Park Guymon has proposed a process for removing oil from the oil filters by washing the oil filters while simultaneously crushing the metal outer case. This process involves the effective removal of the residual oil from the water, and cleaning the washed water with surfactants for recycling.

U.S. Pat. No. 5,135,176 issued to John Barber teaches a method of recycling oil filters by first shredding the filter, which is subsequently placed in an oven or other form of thermal unit wherein the shredded metal particles are separated from the ash and recycled.

U.S. Pat. No. 5,366,165 of Raymond P. Jackman describes a system for recycling and treating used oil filters by a shredding and washing procedure.

SUMMARY OF THE INVENTION

This invention is an advancement in the art of recycling and reclaiming oil laden waste materials, in particular used oil filters, utilizing combustion methods and apparatus having a much greater overall efficiency. Accordingly, it is an object of this invention to provide an apparatus and method for recycling of oil laden hazardous waste material, and in particular internal combustion engine oil filters to provide environmentally safe reuse and disposition of the waste materials, that is not available with the prior art apparatus methods.

The specific method for removing and recovering oil from oil contained waste products, e.g., oil filters, involves a first step of heating the products in a fuel fed primary combustion chamber under reducing i.e., less than stoichiometric air conditions. A plurality of stepped platforms are provided within the chamber in which the oil containing waste products enter from an upper platform and are tumbled to a next adjacent lower platform, etc., synchronously. The changed position of the products, while in the environment combustion chamber, permits additional drainage of oil from the products. The oil products are removed from the primary combustion chamber as liquid oil and as oil vapor. The liquid oil is recovered and removed from the primary combustion chamber. The combustion residue enters a quench pit within which an endless conveyor system conveys the waste solid or metal products in one direction while conveying the remaining smaller residue, ash, etc. in the other direction. The oil in vapor form is then introduced from the primary combustion chamber into an indirect heat exchanger for cooling and condensing and recovering the oil from the vapor. The remaining products of combustion are then passed into a secondary combustion chamber being operated under excess stoichiometric conditions to complete and create clean burning which is then exhausted from the secondary combustion zone.

A further object of this invention is to efficiently recycle and utilize all the components of the oil contaminated waste materials. The oil free steel has prime scrap value to steel mills while the oil can become reprocessed automotive oil or converted into marine fuel, asphalt processing, or other oil bearing products. The residue or ash resulting from the combustion can be used as a concrete extender which strengthens concrete by giving it added working time. The heat generated in a secondary chamber can also be used to heat liquids i.e., water to create steam for plant cleanup or other functions.

DETAILED DESCRIPTION OF THE PREFERRED EMBODIMENTS

Whereas, the present invention has been described in relation to the drawings attached hereto, it should be understood that other and further modifications, apart from those shown or suggested herein, may be made within the spirit and scope of this invention.

WASTE PRODUCTS:

This invention is more aptly directed to the recycling of used internal combustion oil filters, but is also applicable for use in recovering oil from other oil laden products, such as oily rags, oil booms, oil pads, Oil-Dry®, grease and other waste and used products containing significant amounts of oil.

Figure 1:
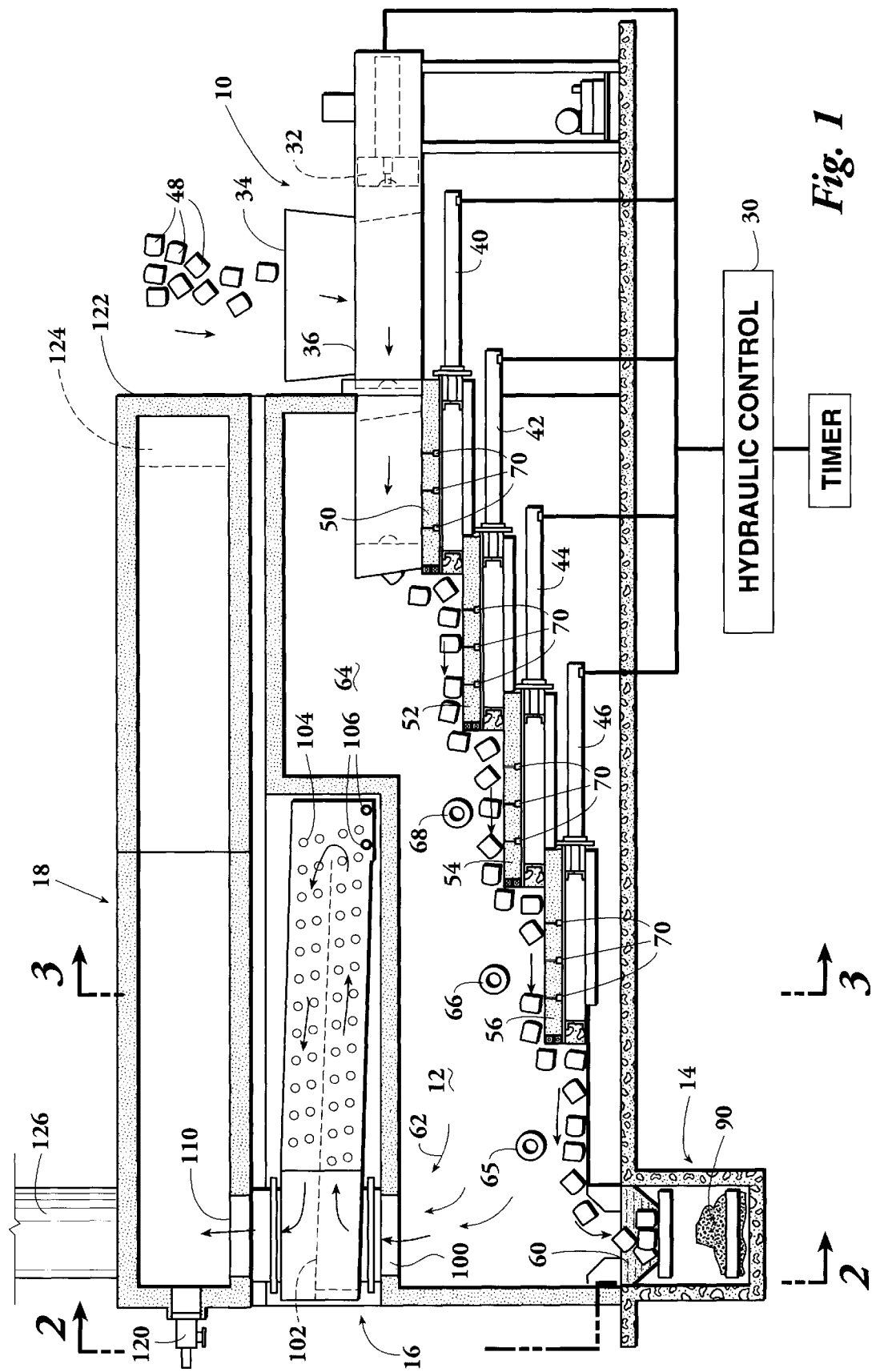
FIG. 1 is a side cross sectional view depicting the apparatus and method of this invention.

THE APPARATUS:

The apparatus and system of this invention consist of 5 major components. Referring to FIG. 1 these are a hydraulic loader generally designated by the numeral 10. A primary combustion chamber 12, a quench pit and conveying system 14, oil vapor reclamation and heat exchange chamber 16 and secondary combustion chamber and stack 18.

HYDRAULIC LOADER:

The hydraulic loader system is a standard form of loading device used by many furnace manufacturers to load materials thereinto. The loader is connected to a hydraulic control means 30 which operates a piston 32 which directs waste products entering through bin 34 into the chute or cylinder 36 where the products are then sealably pushed into the furnace. The hydraulic control system 30 includes a feed timer for sequencing the operation of the hydraulic loader and the individual stepped hydraulic push members 40, 42, 44, and 46. The hydraulic loader system has two functions, i.e., move the waste product material from the bin 34 into the chute 36 onto platform 50. At the same time or alternately the waste products on 50 are pushed and tumbled onto subsequent platforms 52, 54, and 56 upon the timed sequence to operate hydraulic pistons 40, 42, 44, and 46.

Figure 3:
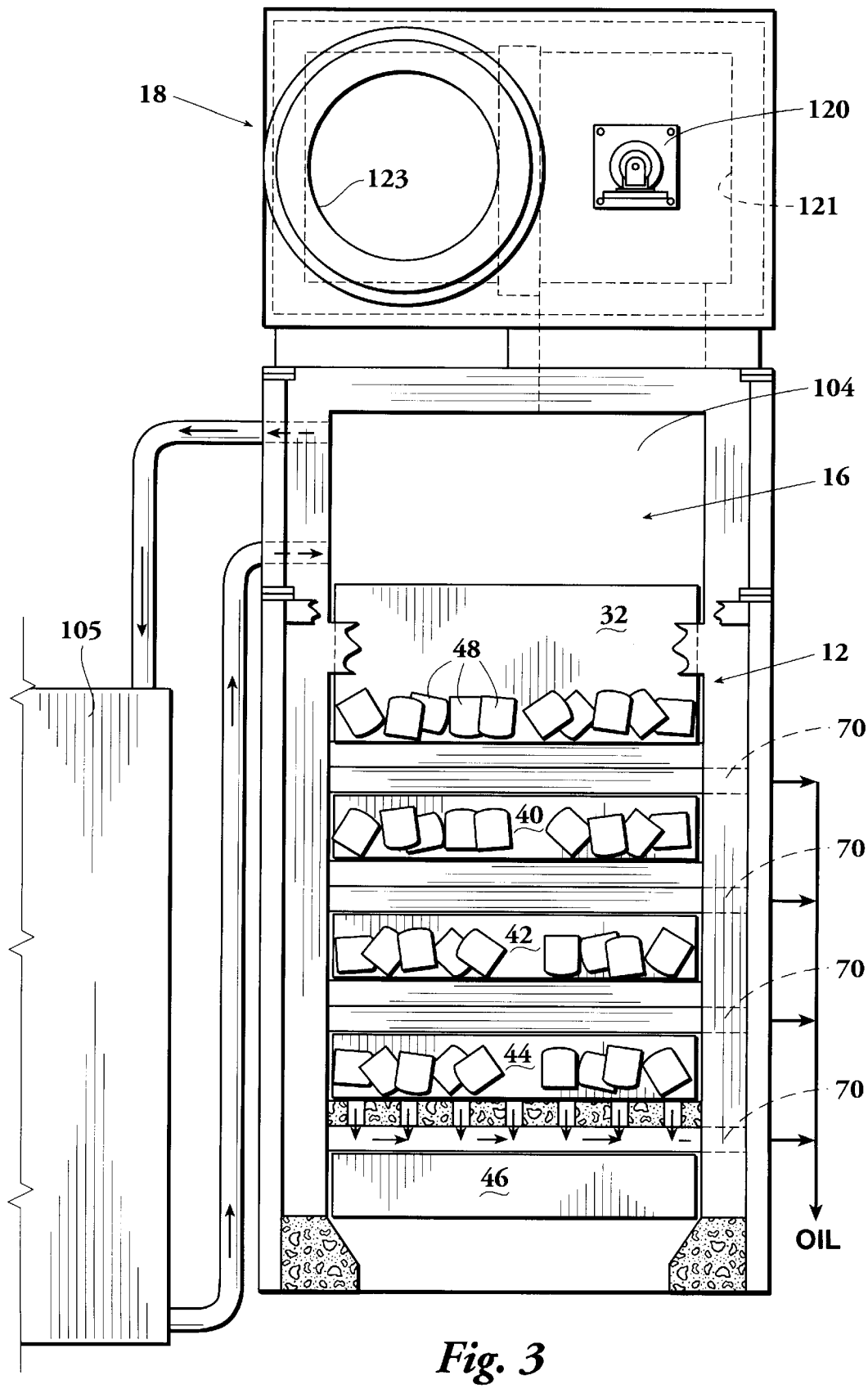
FIG. 3 is a sectional view, taken along the line of 3—3 of FIG. 1.
Figure 4:
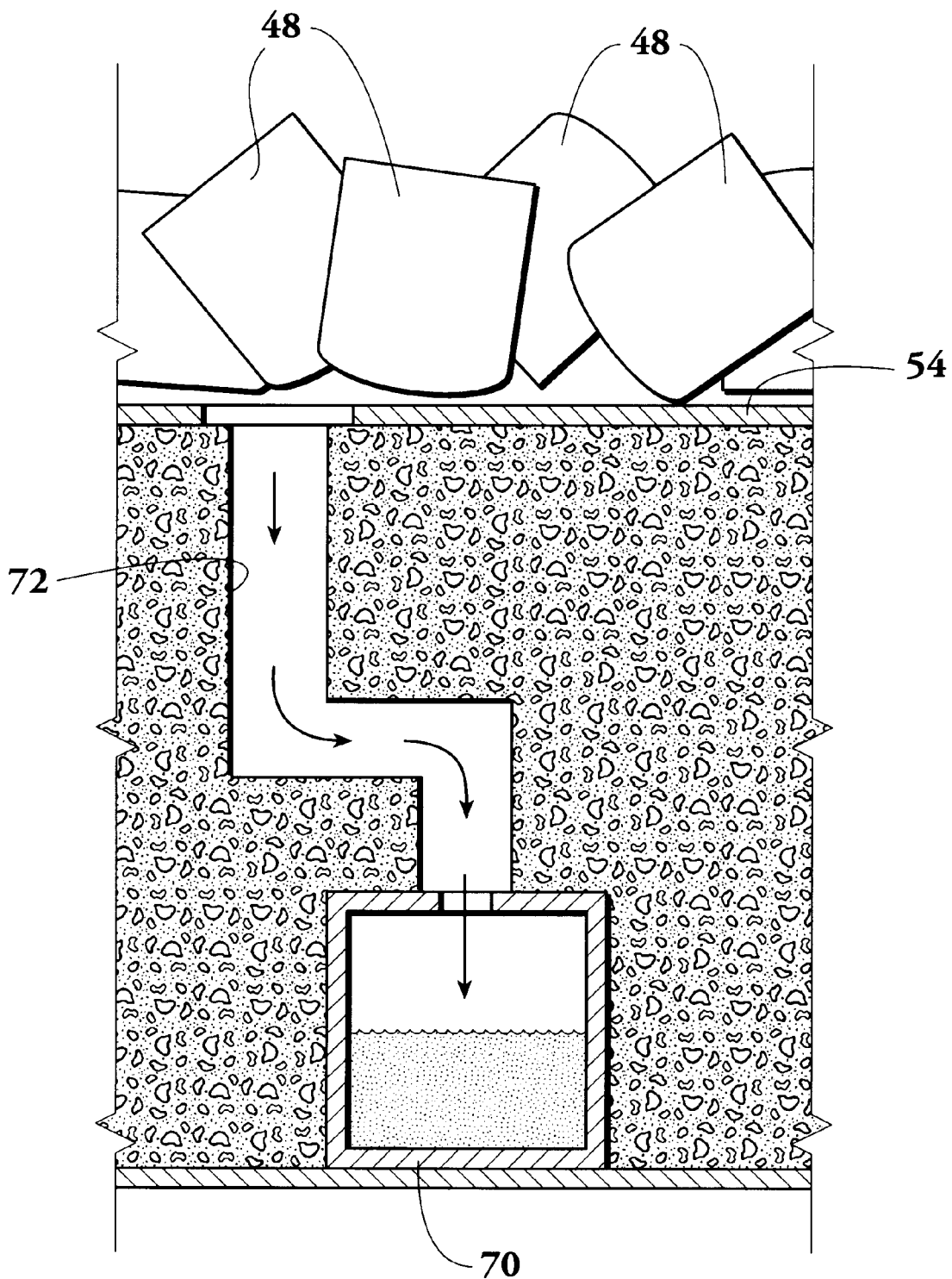
FIG. 4 is an enlarged sectional view of that portion shown circled in FIG. 1.

PRIMARY CHAMBER:

The primary chamber 12 is adapted to receive the waste oil products from the loader, which is slowly conveyed sequentially from platform 50, to platform 52, to platform 54, to platform 56, and thence to the quench pit outlet 14. The quench pit is filled to a water level 60 and is adapted to receive the larger waste products 48 in which the oil therefrom has been substantially removed either in liquid form or in vapors form 62. The primary chamber has one plurality of burners 64, 66, and 68 which maintain the primary chamber at temperature ranges of 800 to 1,000° F. (427–538° C.) under less than stoichiometric air settings. This 'starved air' system is thus, designed to perform two functions: lower the viscosity of the oil so it will drain from the products, and volatize (but not burn) the oil into a vapors 62 which then carried to the oil condensing or reclamation chamber 16. Suitable controls provide regulation of the primary chamber, such as, programmable controllers and control of the gas/air mixture to the burner to maintain the aforesaid conditions. The first area of the primary chamber is a preheating zone 64 which elevates the product up to about 400° F. (205° C.). The preheat temperature dramatically lowers the viscosity of the oil, which drains into oil traps 70 located in the floor of each platform 50, 52, 54 and 56. FIG. 4 is an enlarged view that depicts one form of oil drain in platform 54 wherein, the oil is carried via passageway 72 into the collection conduit 70 which is then drained from the system to an outside collection or storage. (See FIG. 3)

Figure 2:
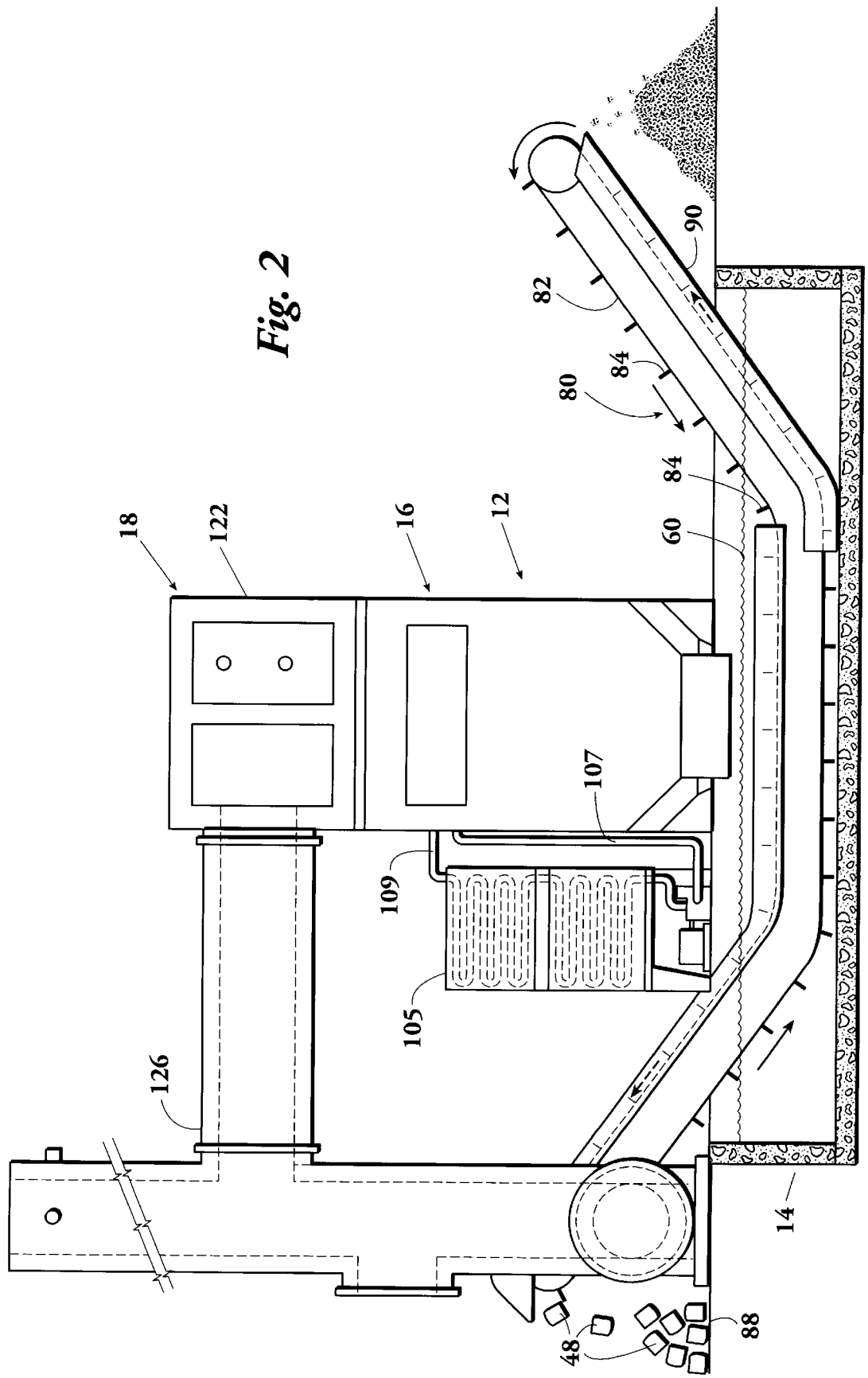
FIG. 2 is an elevational end view, partly in section taken along the line 2—2 of FIG. 1.

QUENCH PIT:

The quench pit 14 is normally transverse to the longitudinal flow of waste products, being filled with a quench liquid 60, e.g., water. As shown in FIG. 2 an endless conveyor system generally designated by the numeral 80 includes a belt 82 of stainless steel grating or mesh having a plurality of spaced flights baffles 84. These baffles are, when moving in the direction shown, adapted to pickup the processed products i.e., oil filters, pads, rags, etc., which have reached the quench. By this time substantially all of the oil has been removed both as liquid and/or vapor, the latter transferred to the oil reclamation and condensing chamber 16. The quench pit prevents any gases to escape through this area. As the metal filters and other products fall into the quench pit, the larger products are captured on the top level of the conveyor and exit under the water seal to a storage or into a container 88 for transport to a steel mill. The lighter ash and residue products will filter through the water seal, the top of the conveyor mesh 82 dropping to the bottom of the pit. The elevated baffles or flights 84 then serve as rakes as the flights return across the bottom of the pit to the other side, where the ash is carried up an inclined trough 90 to storage and/or containers where the ash products can then be shipped for other uses e.g., as a concrete strength or retarding additive.

OIL RECLAMATION CHAMBER:

Oil reclamation chamber 16 is adapted to receive, via conduit 100, the volatilized oil vapors 62 from the primary chamber 12. The reclamation chamber is essentially a heat exchanger having a central baffle therein 102 which is angularly directed within the serpentine coils 104 of the reclamation chamber for drainage purposes. Condensed oil vapors are removed from the chamber via conduits 106. The temperature of the vapors are cooled to below he recondensing point of the oil, i.e., about 600° F. (318° C.) as the oil vapor laden gases are caused to wind their way through the water cooling tubes 104. The remaining oil vapors then exit to the secondary chamber 18 via opening 110.

SECONDARY CHAMBER:

The purpose of the secondary chamber 18 is to destroy any remaining unburned fuel or other compounds remaining in the gas stream and can become the ultimate control over the production (or charging) capacity of the whole system. As such, the chamber is preferably operated under stoichiometric or greater than stoichiometric air conditions utilizing one or more burners 120. The secondary chamber is designed to hold the products of combustion at approximately 1800° F. (990° C.) for approximately two or three seconds with the gas stream flowing along one conduit 121 towards the end of the chamber 122 where it is diverted through opening 124 and reversed back through the return conduit 123 ultimately exiting via exhaust 126.

The secondary chamber is initially fired up to temperature using natural gas or some other fossil fuel, however, once the desired temperature is reached, and the remainder of the system comes on line, the secondary chamber can become thermally self supporting. Normally, 30–60% of the process gas stream will contain enough fuel, as oil vapor, along with the proper air mixture to maintain a desired secondary chamber temperature. If the secondary chamber starts dropping in temperature, the operator may either increase the vapors entering the primary chamber and/or lower the reclamation chamber cooling water, or fire up the burner 120. The secondary chamber will typically operate with 10% free oxygen in the gas stream, an oxygen monitor, not shown, is used as to monitor the gas stream at all times therein. If the oxygen level drops to a given amount, e.g., under 7%, or other desired set point, several control functions can begin. At 7% oxygen, the loader 10 can be locked out and the primary chamber air modulated down. If the oxygen level returns to 8% or higher, then the operation will continue normally. However, if the oxygen level continues down, e.g., to 6%, or less, then additional air is supplied into the secondary chamber until the desire level has been achieved. In an emergency, if the oxygen level continues to drop e.g., below 4% and remains at this level for several seconds a water spray system is adapted to activate quenching the activity in the primary chamber 12.

Other controls insure clean exhaust gases by regulating the charging rate of the system if the fuel rate exceeds 8 MM/BTU/Hr.

The secondary chamber is to maintain a minimum temperature of 1800° F. If the temperature in the secondary chamber begins to rise and exceeds the minimum by, for example, 100° F., then the primary chamber air is reduced and a hydraulic loader 10 locked out. If the temperature reduces back to the minimum, normal operation can continue. However, if the secondary chamber temperature continues to rise over 150° F. above the minimum set point, then emergency air is caused to enter the secondary chamber. If the system does not come under control within 60 seconds, the emergency water spray quench will deploy. Thus, the water spray system will continue to operate until all of the following are satisfied;

The oxygen level rises over 4%;

The secondary chamber temperature is under the 150° F. over temperature; and

The emergency secondary chamber air is off.

Figure 5:
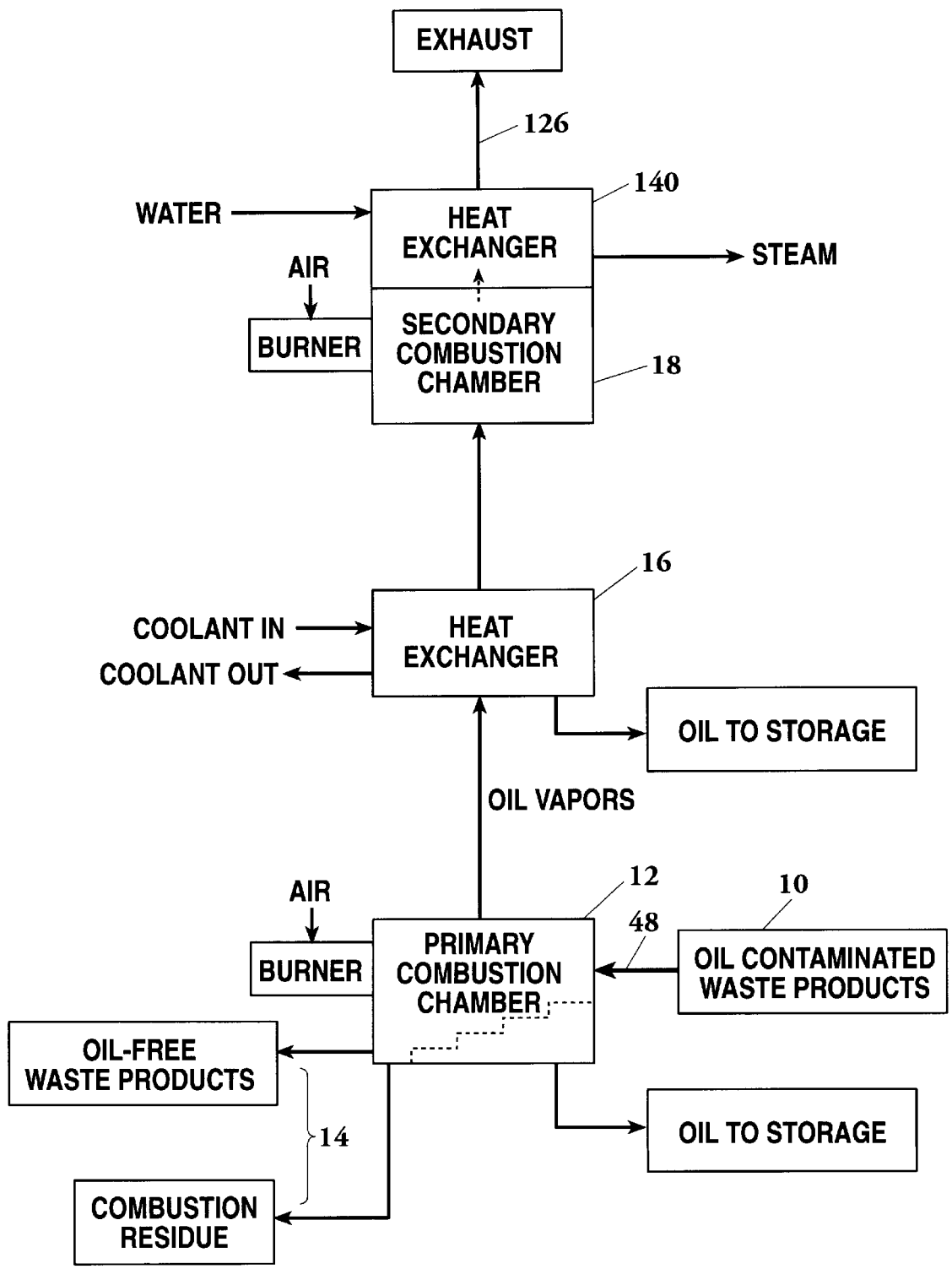
FIG. 5 is a schematic diagram of the process of this invention.

In another embodiment of the invention, the heat in the secondary chamber may be utilized in conjunction with a heat exchanger 140 (see FIG. 5) as an auxiliary heat source such as to make steam or for other uses.

In the operation of the system disclosed, waste oil products, such as oil filters and other adsorbents, including the but not limited to oil booms, oily rags, pads, and Oil-Dri® are loaded into the loader 36. The products are then charged into the primary furnace chamber 64 at a scheduled feed rate controlled by the hydraulic system/timer 30. After the ram 32 is withdrawn to the position shown, the unit automatically reseals. Within the primary chamber are a plurality of platforms (four shown), following the initial charging station, with the product moving down the platforms by the action of the floor sweep rams 40, 42, 44, and 46. Each of the platforms include a plurality of oil collection drains 70, as shown enlarged in FIG. 4, which carry the oil outside the furnace. In the early phase of the process as the oil heats up it thins and runs into the collection drains 70. Approximately 20–30% of the oil trapped in the filters and adsorbents are collected through gravity drains 70. As the product charge progresses down the platforms, closer to burners 65, 66 and 68, the primary chamber temperature increases. The remaining oil begins to vaporize and is drafted towards the recycle chamber 16. Vaporization takes place at approximately 500–1000° F. (260–538° C.) typically at about 800° F. (427° C.). From the time the charge products enter the primary combustion chamber, it will be exposed to the heat for approximately 3–6 hours. By the time the product charge reaches the final tier, it should be oil free and consist of only clean steel, fly ash and/or other solid products of combustion. These products are slowly pushed into the quench tank 14 containing the conveying device described, as best shown in FIG. 2, for removal outside the system. The oil vapors 62 and other products of combustion proceed to the recycling chamber 16 where the temperature of the oil laden exhaust is lowered to approximately 200–400° F. (93–204° C.). Oil then recondenses within the recycled chamber and runs to a collection point at the bottom of the recycled chamber wherein the oil is removed via conduits 106. The temperature of the recycled chamber 16 is controlled to allow sufficient vaporized fuel to sustain the secondary chamber 18 operating at a minimum of 1800° F. (982° C.). As stated, the secondary chamber 16 can also be used as a process heater or as a boiler, dryers or other use.

What is claimed:

1. Apparatus for removing and recovering oil from oil containing solid waste products comprising:

a primary combustion chamber heated by at least one fuel/air burner, each said burner operating at less than stoichiometric requirements for complete combustion of said of solid waste products;

a plurality of stepped platforms in said primary combustion chamber to receive said oil containing solid waste products;

means to sequentially and synchronously convey and tumble said oil containing solid waste products from an upper platform to a next adjacent lower platform to create oil free solid waste products and free oil utilizing a plurality of hydraulic rams operating synchronously and sequentially;

a water filled quench pit to receive said oil free waste products and combustion residue; and a secondary combustion chamber operated under excess stoichiometric air conditions.

2. Apparatus according to claim 1 wherein said primary combustion chamber includes a first zone at one temperature sufficient to lower the viscosity of said oil, and a second zone at a higher temperature whereby any remaining oil is vaporized.

3. A method for removing and recovering oil from oil containing waste products comprising the steps of:

(a) introducing said oil containing waste products into a primary combustion chamber operated under reducing or less than stoichiometric air conditions;

(b) heating said primary combustion chamber at a temperature sufficient to lower the viscosity of said oil to permit said oil to drain from said waste products as a liquid and as oil vapor creating substantially oil free waste products;

(c) conveying, in said primary combustion chamber, said oil containing waste products from at least one collection grid platform to at least one adjacent lower platform sequentially and synchronously by a plurality of hydraulic push rods;

(d) recovering and removing said oil as liquid from said primary chamber;

(e) recovering and removing said oil free waste products and combustion residue from said primary chamber;

(f) dropping said oil free waste products and combustion residue into a water filled quench pit;

(g) passing said remaining products of combustion into a secondary combustion chamber being operated under excess stoichiometric air conditions; and (h) exhausting substantially clean products of combustion from said secondary combustion chamber.

4. The method of claim 3 wherein said conveyor is an endless type removing said substantially oil free waste products from said quench pit in one direction and said combustion residue in an opposite direction.

5. The method of claim 3 wherein said secondary combustion chamber includes a heat exchanger therein for producing heated liquids or vapors.

6. The method of claim 3 wherein said oil containing waste products are engine oil filters.

7. The method of claim 3 wherein the temperature in said primary combustion chamber is within the range of 800–1,000° F. (427–538° C.).

* * * * *